US012260602B2

(12) United States Patent
Kubota

(10) Patent No.: US 12,260,602 B2
(45) Date of Patent: Mar. 25, 2025

(54) IMAGE PROCESSING METHOD, PROGRAM, AND IMAGE PROCESSING DEVICE

(71) Applicants: ARS TECHNE CORPORATION, Chofu (JP); Iwao Kubota, Chofu (JP)

(72) Inventor: Iwao Kubota, Chofu (JP)

(*) Notice: Subject to any disclaimer, the term of this patent is extended or adjusted under 35 U.S.C. 154(b) by 384 days.

(21) Appl. No.: 17/783,010

(22) PCT Filed: Dec. 9, 2019

(86) PCT No.: PCT/JP2019/048120
§ 371 (c)(1),
(2) Date: Jun. 7, 2022

(87) PCT Pub. No.: WO2021/117099
PCT Pub. Date: Jun. 17, 2021

(65) Prior Publication Data
US 2023/0027047 A1 Jan. 26, 2023

(51) Int. Cl.
G06V 10/141 (2022.01)
G06T 5/50 (2006.01)
(Continued)

(52) U.S. Cl.
CPC .............. G06V 10/141 (2022.01); G06T 5/50 (2013.01); G06T 5/94 (2024.01); G06T 17/05 (2013.01);
(Continued)

(58) Field of Classification Search
CPC ........ G06V 10/141; G06T 2207/20221; G06T 2207/10152; G06T 17/05; G06T 5/50; G06T 5/94
See application file for complete search history.

(56) References Cited

U.S. PATENT DOCUMENTS 6,359,618 B1 * 3/2002 Heirich ................ G06T 15/04
345/426
2002/0009218 A1 * 1/2002 Chapman .............. G06T 7/0002
382/141
(Continued)

FOREIGN PATENT DOCUMENTS

JP 2011-128872 A 6/2011
JP 2013-123809 A 6/2013
(Continued)

OTHER PUBLICATIONS

I. Sato, Y. Sato and K. Ikeuchi, "Illumination distribution from shadows," Proceedings. 1999 IEEE Computer Society Conference on Computer Vision and Pattern Recognition (Cat. No PR00149), Fort Collins, CO, USA, 1999, pp. 306-312 vol. 1, doi: 10.1109/CVPR.1999.786956. (Year: 1999).*

(Continued)

Primary Examiner — John Villecco
Assistant Examiner — Alexander John Rodgers
(74) Attorney, Agent, or Firm — Harness, Dickey & Pierce, P.L.C.

(57) ABSTRACT

Image processing includes obtaining image $I[0,0]$ of a picture captured by an image capture means, in a state where light is irradiated to the picture from a light source at a reference position relative to a normal line of the picture, obtaining image $I[\alpha 1,0]$ of the picture captured by an image capture means, in a state where the light is irradiated to the picture from the light source at a position inclined from the reference position at an angle $\alpha 1$ in the first direction, obtaining image $I[0, \beta 1]$ of the picture captured by an image capture means, in a state where the light is irradiated to the picture from the light source at a position inclined by an angle $\beta 1$ from the reference position in a second direction different from the first direction, creating a three-dimensional map of the picture, using a set of images $I[0, \beta 1]$ and (Continued)

I[0, β2], merging at least a part of each image I[α1,0], image I[0,β1], and image I[0,β2] with respect to image I[0,0], and recording as two-dimensional image data the image subjected to the emphasizing process.

17 Claims, 12 Drawing Sheets

(51) Int. Cl.
    *G06T 5/94*     (2024.01)
    *G06T 17/05*     (2011.01)

(52) U.S. Cl.
    CPC ............ *G06T 2207/10152* (2013.01); *G06T 2207/20221* (2013.01)

(56) References Cited

U.S. PATENT DOCUMENTS

| | | | |
|---|---|---|---|
| 2003/0066949 A1* | 4/2003 | Mueller | H04N 13/254 348/E13.016 |
| 2004/0212725 A1* | 10/2004 | Raskar | G06T 15/02 348/370 |
| 2011/0292179 A1* | 12/2011 | Hernandez | G06T 7/521 348/46 |
| 2013/0286445 A1 | 10/2013 | Yasutomi | |
| 2017/0230528 A1 | 8/2017 | Colagrande et al. | |
| 2017/0301101 A1* | 10/2017 | Stoppe | G01N 21/4795 |
| 2018/0045634 A1* | 2/2018 | Bachalo | G01N 15/0205 |
| 2018/0122092 A1* | 5/2018 | Stoppe | G06T 5/73 |
| 2018/0232899 A1* | 8/2018 | Lansel | H04N 23/56 |
| 2018/0259394 A1* | 9/2018 | Gotoh | G01J 3/504 |
| 2019/0320094 A1* | 10/2019 | Jackson | H04N 1/603 |
| 2020/0041261 A1* | 2/2020 | Bernstein | A61B 1/00167 |
| 2023/0027047 A1* | 1/2023 | Kubota | G06T 1/0007 |

FOREIGN PATENT DOCUMENTS

| | | |
|---|---|---|
| JP | 2013-232109 A | 11/2013 |
| JP | 2013-242624 A | 12/2013 |
| JP | 2019-174116 A | 10/2019 |
| WO | 2018-037604 A1 | 3/2018 |

OTHER PUBLICATIONS

A. Martos and B. Ruiz, "Realistic virtual reproductions. Image-based modelling of geometry and appearance," 2013 Digital Heritage International Congress (DigitalHeritage), Marseille, France, 2013, pp. 127-134, doi: 10.1109/DigitalHeritage.2013.6743722. (Year: 2013).*

Y. Iwahori, H. Sugie and N. Ishii, "Reconstructing shape from shading images under point light source illumination," [1990] Proceedings. 10th International Conference on Pattern Recognition, Atlantic City, NJ, USA, 1990, pp. 83-87 vol. 1, doi: 10.1109/ICPR.1990.118069. (Year: 1990).*

Tominaga, Shoji, and Norihiro Tanaka. "Spectral image acquisition, analysis, and rendering for art paintings." Journal of Electronic Imaging 17.4 (2008): 043022-043022. (Year: 2008).*

S. Tominaga, H. Ujike and T. Horiuchi, "Surface reconstruction of oil paintings for digital archiving," 2010 IEEE Southwest Symposium on Image Analysis & Interpretation (SSIAI), Austin, TX, USA, 2010, pp. 173-176, doi: 10.1109/SSIAI.2010.5483891. (Year: 2010).*

Tobias Ritschel, et al., "3D Unsharp Masking for Scene Coherent Enhancement"; ACM Transactions on Graphics; vol. 27, No. 3, Article 90; XP059140648; ISSN: 0730-0301; DOI: 10.1145/1360612.1360689; pp. 1-8; dated Aug. 1, 2008 (total 8 pages).

Office Action issued in the corresponding European Patent Application No. 19956036.8; dated Mar. 5, 2024 (total 8 pages).

Office Action issued in corresponding Chinese Patent Application No. 201980103506.6 dated Apr. 22, 2023, with English translation (11 Pages).

Extended European Search Report for corresponding Application No. 19956036.8 dated Nov. 3, 2022 (8 Pages).

International Search Report (English and Japanese) issued in PCT/JP2019/048120, mailed Jan. 28, 2020; ISA/JP (5 pages).

* cited by examiner

I[α1, o]       I[α2, o]

I[0, β1]       I[0, β2]

IMAGE PROCESSING METHOD, PROGRAM, AND IMAGE PROCESSING DEVICE

TECHNICAL FIELD

The present invention relates to an image processing method and an image processing device.

RELATED ART

There are known in the art techniques for reproducing pictures classed as cultural assets (including Western paintings, Japanese paintings, folding screens, etc.). For example, Patent Document 1 discloses a technique for merging images captured by a first light source (a flash) and images captured by a second light source (an observation light in a display environment) to create a copy of a picture that includes shadows.

PRIOR ART

Patent Document

Patent Document 1: JP 2011-128872A

SUMMARY

Problem to be Solved

Pictures are created using various techniques, and thus it is difficult to reproduce a texture and three-dimensionality of an original picture simply by merging images of the picture taken with a flash and with an observation light. The present invention provides a technique for recording a texture and three-dimensionality of an original picture with high reproducibility.

Solution

According to one aspect of the invention, there is provided an image processing method including: preparing a picture to be converted into data, a light source for irradiating the picture with light, and an image capture means for capturing an image of the picture; installing the image capture means at a position where the optical axis of the image capture means and a normal line of the painting have a predetermined relationship; obtaining image I[0,0] of the picture captured by the image capture means, in a state where the light is irradiated to the picture from the light source at a reference position relative to the normal line of the picture; obtaining image I[$\alpha$1,0] of the picture captured by the image capture means, in a state where the light is irradiated to the picture from the light source at a position inclined from the reference position at an angle $\alpha$1 in the first direction; obtaining image I[0, $\beta$1] of the picture captured by the image capture means, in a state where the light is irradiated to the picture from the light source at a position inclined by an angle $\beta$1 from the reference position in a second direction different from the first direction; obtaining image I[0, $\beta$1] of the picture captured by the image capture means, in a state where the light is irradiated to the picture from the light source at a position inclined from the reference position at an angle $\beta$2 in the second direction; creating a three-dimensional map of the picture, using a set of images I[0, $\beta$1] and I[0, $\beta$2]; merging at least a part of each of image I[$\alpha$1,0], image I[0,$\beta$1], and image I[0,$\beta$2] with respect to image I[0,0]; performing an emphasizing process to emphasize a shadow of the merged image in accordance with a height indicated by the three-dimensional map; and recording as two-dimensional image data the image subjected to the emphasizing process.

The image processing method may further include obtaining image I[$\alpha$2,0] of the picture taken by the image capture means, in a state where the picture is irradiated with light from the light source at a position inclined from the reference position by an angle $\alpha$2 different from the angle $\alpha$1 in the first direction, wherein in the creating of the three-dimensional map, image I[$\alpha$1, 0], an image [$\alpha$2, 0], image I[0, $\beta$1], and image I[0, $\beta$2] are used, and in the merging, at least a part of each of image I[$\alpha$1, 0], image I[$\alpha$2, 0], image I[0, $\beta$1], and image I[0, $\beta$2] is merged with image I[0, 0].

The emphasizing process may be a process for emphasizing a contrast of the shadow.

In the emphasizing process, the processing may be performed in which the contrast of the shadow increases as the height increases.

According to another aspect of the invention, there is provided a program causing a computer to execute a process, the process including: preparing a picture to be converted into data, a light source for irradiating the picture with light, and an image capture means for capturing an image of the picture; installing the image capture means at a position where the optical axis of the image capture means and a normal line of the painting have a predetermined relationship; obtaining image I[0,0] of the picture captured by the image capture means, in a state where the light is irradiated to the picture from the light source at a reference position relative to the normal line of the picture; obtaining image I[$\alpha$1,0] of the picture captured by the image capture means, in a state where the light is irradiated to the picture from the light source at a position inclined from the reference position at an angle $\alpha$1 in the first direction; obtaining image I[0, $\beta$1] of the picture captured by the image capture means, in a state where the light is irradiated to the picture from the light source at a position inclined by an angle $\beta$1 from the reference position in a second direction different from the first direction; obtaining image I[0, $\beta$2] of the picture captured by the image capture means, in a state where the light is irradiated to the picture from the light source at a position inclined from the reference position at an angle $\beta$2 in the second direction; creating a three-dimensional map of the picture, using a set of images I[0, $\beta$1] and I[0, $\beta$2]; merging at least a part of each of image I[$\alpha$1,0], image I[0,$\beta$1], and image I[0,$\beta$2] with respect to image I[0,0]; performing an emphasizing process to emphasize a shadow of the merged image in accordance with a height indicated by the three-dimensional map; and recording as two-dimensional image data the image subjected to the emphasizing process.

According to yet another aspect of the invention, there is provided an image processing device, including: a first obtaining means that obtains image I[0,0] of a picture captured by an image capture means, in a state where light is irradiated to the picture from a light source at a reference position relative to a normal line of the picture, the picture being converted into data, the light source irradiating the picture with light, the image capture means being installed at a position where the optical axis of the image capture means and the normal line of the painting have a predetermined relationship; a second obtaining means that obtains image I[$\alpha$1,0] of the picture captured by the image capture means, in a state where the light is irradiated to the picture from the light source in a position inclined from the reference position at an angle $\alpha$1 in the first direction; a third obtaining means that obtains image I[0, β1] of the picture captured by the image capture means, in a state where the light is irradiated to the picture from the light source at a position inclined by an angle β1 from the reference position in a second direction different from the first direction; a fourth obtaining means that obtains image I[0, β2] of the picture captured by the image capture means, in a state where the light is irradiated to the picture from the light source in a position inclined from the reference position at an angle β2 in the second direction; a creating means that create a three-dimensional map of the picture, using a set of images I[0, β1] and I[0, β2]; a merging means that merges at least a part of each of image I[α1,0], image I[0,β1], and image I[0,β2] with respect to image I[0,0]; a processing means that performs an emphasizing process to emphasize the shadow of the merged image in accordance with a height indicated by the three-dimensional map; and a recording means that records as two-dimensional image data the image subjected to the emphasizing process.

Advantageous Effects

The present invention enables a texture and three-dimensionality of an original picture to be recorded with high reproducibility.

DESCRIPTION OF REFERENCE NUMERALS

1 . . . Image processing systems, 10 . . . light source, 20 . . . camera, 30 . . . image processing device, 31 . . . obtaining means, 32 . . . creating means, 33 . . . merging means, 34 . . . processing means, 35 . . . recording means, 40 . . . image scanner, 91 . . . convex, 92 . . . convex, 301 . . . CPU, 302 . . . memory, 303 . . . storage, 304 . . . communication IF, 305 . . . display, 306 . . . keyboard, 911 . . . vertex

DETAILED DESCRIPTION

1. Summary

In general, pictures have surface irregularities. For example, in oil paintings, convexities are formed on a surface by brush marks, changes in a thickness of paint, and by use of various expressive techniques. Upon close observation of Japanese paintings, including ukiyo-e, and woodblock prints, for example, it is noticeable that paper texture is incorporated as an element of a picture. Pictures produced, for example, by painting incorporate not only surface irregularities but also impart complex visual effects that result from variations present in particles in paints. A fine-grained blue paint pigment can be considered, for example, in which transparent prismatic mineral glass particles are present. Due to differences in particle sizes in such paint light reflectance and direction and a resultant appearance is non-uniform, and varies depending on a light source and a position of an observer. To appreciate expressive nuance in a pictorial representation, it is necessary to enable viewing under light that varies both in brightness and angle. However, since pictures in general become degraded as a result of exposure to light (particularly ultraviolet light and short wavelength visible light), it is not acceptable to illuminate pictures with intense light for viewing.

The inventors of the present application have researched techniques for recording a color of a picture, a technique of a painter, including brushwork, so that an impression imparted by the painter's picture can be properly recorded and reproduced; and have developed a technique referred to as DTIP (Dynamic Texture Image Processing). This technique is used to record as two-dimensional image data three-dimensional paintings that include surface irregularities. An image printed using such image data reproduces in a planar image a three-dimensional effect akin to that present in an oil painting that has various surface irregularities. The planar image thus produced was named "Precision Remaster Art" ("Remaster Art" is a registered trademark) by the inventors of the present application. Precision Remaster Art has been certified as official replica (the other original picture) by the Museum of Art, Orsay, France.

2. Configuration

Figure 1:
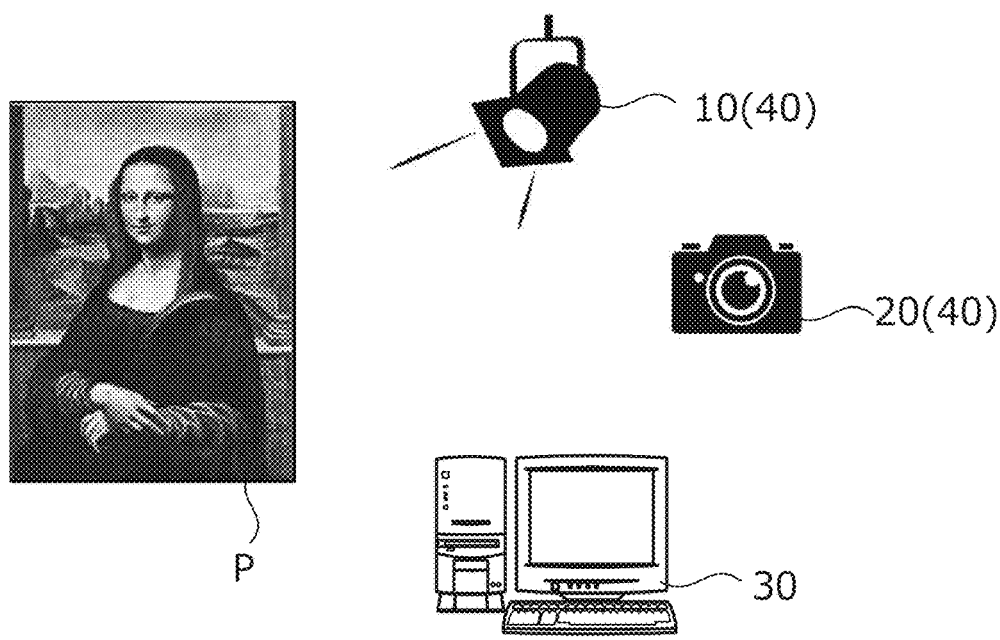
FIG. 1 is a diagram showing an outline of an image processing system 1 according to an embodiment.

FIG. 1 is a diagram showing an outline of an image processing system 1 according to an embodiment. Image processing system 1 is a system for recording a picture P as two-dimensional image data. Picture P is an example of a painting for conversion into data. Image processing system 1 includes light source 10, camera 20, and image processing device 30. Light source 10 is a device for outputting light for irradiation to picture P. Camera 20 is a digital still camera that captures an image of picture P and generates image data. Image processing device 30 is a device for processing and recording image data generated by camera 20. Instead of camera 20 and light source 10, image scanner 40 may be used as an image capture device in which these functions are integrated. Each of camera 20 and image scanner 40 is an example of an image capture means.

Figure 2:
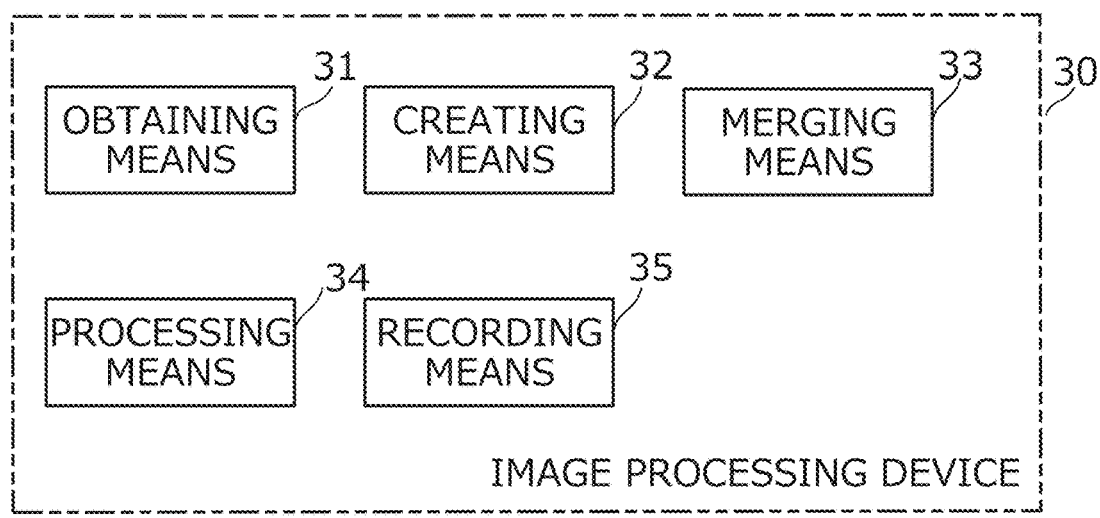
FIG. 2 is a diagram illustrating a functional configuration of image processing device 30.

FIG. 2 is a diagram illustrating a functional configuration of image processing device 30. Image processing device 30 includes obtaining means 31, creating means 32, merging means 33, processing means 34, and recording means 35. Obtaining means 31 obtains plural images I from an external device such as camera 20 (an example of the first obtaining means, the second obtaining means, the third obtaining means, and the fourth obtaining means), and the plurality of images I are captured in which light source 10 is provided in a variety of positional relationships relative to picture P. Specifically, obtaining means 31 obtains at least image I[0, 0], image I[1, 0], image I[0, β1], and image I[0, β2]. Although details will be described later, image I[0, 0] is an image obtained when picture P is captured by the image capture means with light irradiated from light source 10 at a reference position relative to a normal line of picture P. Image I[α1, 0] is an image obtained when picture P is captured by the image capture means with light irradiated from light source 10 at a position inclined in a first direction by an angle α1 from the reference position. Image I[0, β1] is an image obtained when picture P is captured by the image capture means with light irradiated from light source 10 at a position inclined at an angle β1 in a second direction different from the first direction from the reference position. Image I[0, β2] is an image obtained when picture P is captured by the image capture means with light irradiated from light source 10 at a position inclined in the second direction by an angle β2 from the reference position. Creating means 32 creates a three-dimensional map of the picture using at least a set of images I[0, β1] and I[0, β2]. Merging means 33 merges the plurality of images I. Processing means 34 performs predetermined image processing on the image I either before or after merging the plurality of images. The image processing is, for example, processing to emphasize shadows. Recording means 35 records as image data the image processed by processing means 34 and merged by merging means. The image data is two-dimensional image data. The format of the data may be a general-purpose format such as bmp or jpeg, or may be a unique format.

Figure 3:
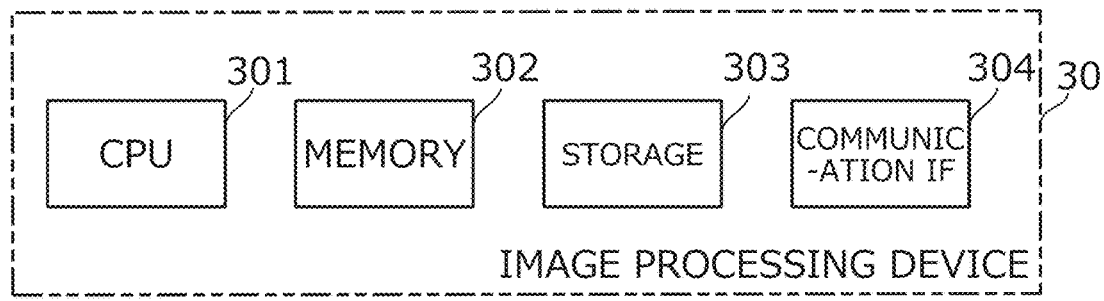
FIG. 3 is a diagram illustrating a hardware configuration of image processing device 30.

FIG. 3 is a diagram illustrating an exemplary hardware configuration of image processing device 30. Image processing device 30 is a computer device having CPU 301, memory 302, storage 303, communication IF 304, display 305, and keyboard 306. CPU 301 is a processor that executes a process in accordance with a program. Memory 302 is a main recording device that functions as a work area when CPU 301 executes the process, and includes, for example, a ROM (Read Only Memory) and a RAM (Random Access Memory). Storage 303 is a nonvolatile storage device for recording various data and programs, and consists of, for example, an SSD (Solid State Drive) or an HDD (Hard Disk Drive). Communication IF 304 is an interface for communicating with other devices. Display 305 is a display device for displaying various kinds of information or UI screens in accordance with a process performed by CPU 301, and is an example of an output device. Keyboard 306 is an example of an input device for enabling an operator to input information or instructions to image processing device 30.

In this example, storage 303 records a program (hereinafter, referred to as "image processing program") that causes the computer device to function as image processing device 30. When the image processing program is being executed, CPU 301 is an example of obtaining means 31, merging means 33, processing means 34, and recording means 35.

As light source 10 and camera 20, a general-purpose light source device and a digital still camera is used. The color temperature of the light emitted by light source 10 is, for example, 5000K. The color temperature of the light emitted by light source 10 can be changed in accordance with an ambient light. For example, when an ambient light is about 3000K, the color temperature of the light emitted by light source 10 may be set to be about 4000K. As image scanner 40, a scanner that can change a light incident angle (a light-incident angle-variable type image scanner) is used.

3. Operation

Figure 4:
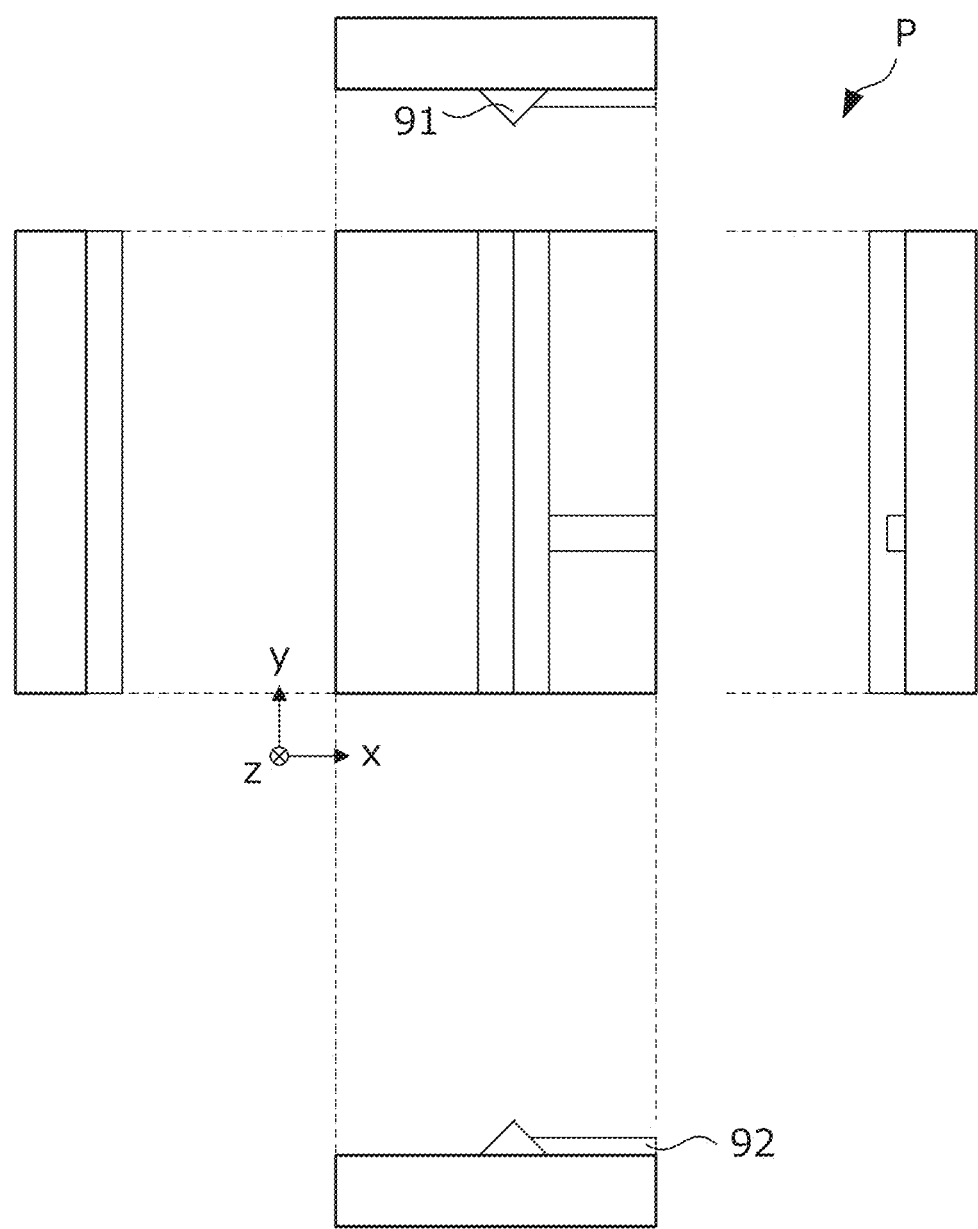
FIG. 4 illustrates a surface structure of picture P.

FIG. 4 is a diagram illustrating a surface structure of picture P. FIG. 4 illustrates each of a front view, top view, bottom view, left side view, and right-side view of picture P. On the surface of picture P, concavities and convexities are formed by a painting material such as a painting tool or a base medium such as a canvas. In FIG. 4, the concavities and convexities are simplified as convex portion 91 and convex portion 92. For purposes of explanation, the coordinate axes are defined here as follows. When picture P is placed in a viewing state, the vertical upward direction is defined as the y-axis positive direction, and the rightward direction is defined as the x-axis positive direction. Further, the x-axis and the y-axis and the direction in which a so-called right hand system is formed are defined as the z-axis. The coordinate axes shown correspond to the front view. Convex portion 91 has a triangular prism shape extending in the y direction, and convex portion 92 has a square prism shape extending in the x direction. Hereinafter, the process of converting picture P into image data will be described.

Figure 5:
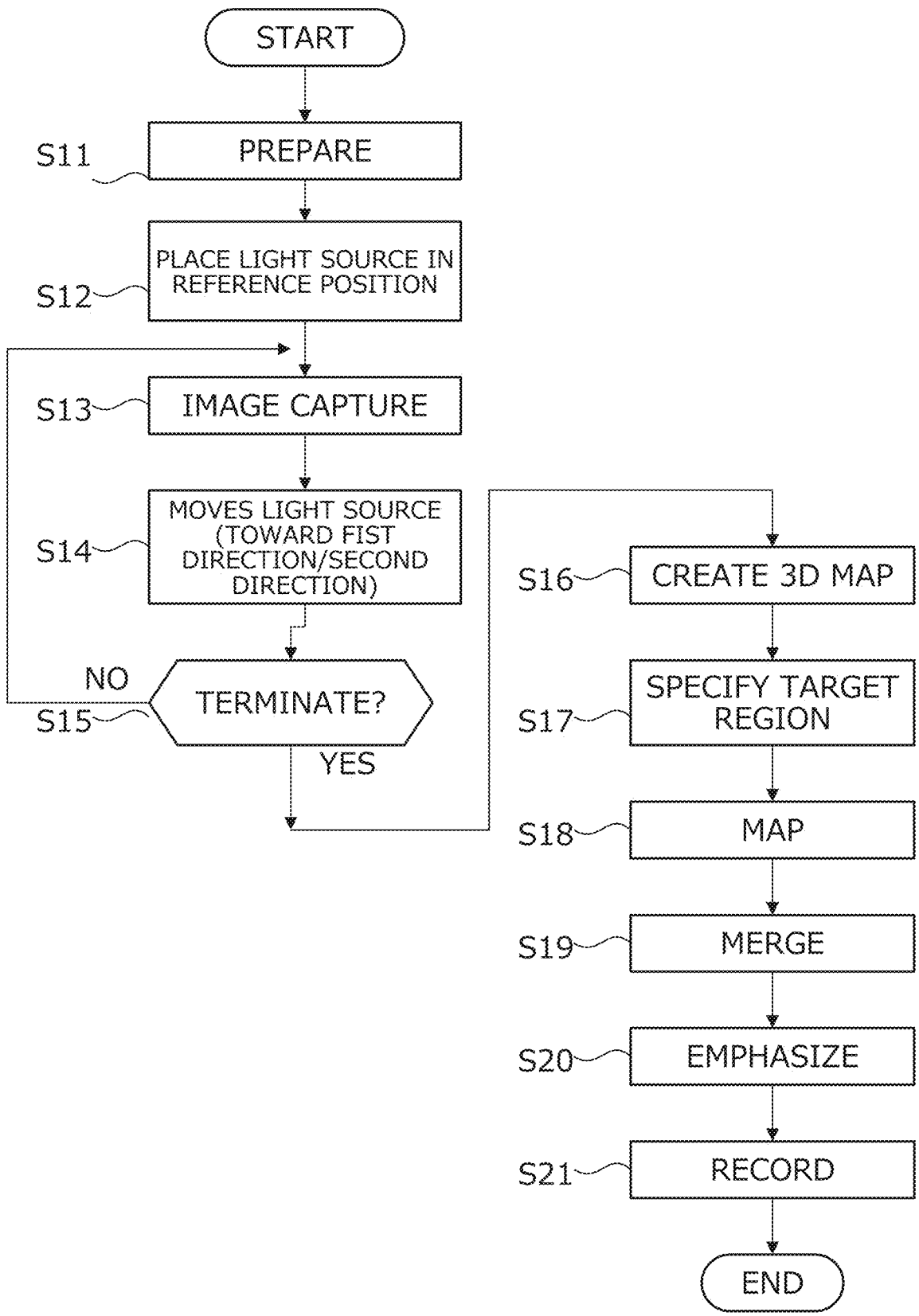
FIG. 5 is a flowchart showing the operation of image processing system 1.

FIG. 5 is a flowchart showing the operation of image processing system 1. At step S11, the operator prepares picture P, light source 10, camera 20, and image processing device 30. An image scanner 40 may be used in place of light source 10 and camera 20, but the following description focuses on an example in which light source 10 and camera 20 are used. Picture P is a painting to be converted into two-dimensional image data, and refers to, for example, oil painting, Japanese cut-and-paste paper painting, Japanese painting, or a folding screen. The medium (or substrate) on which the pictures are painted may be any of canvas, picture paper, Japanese paper, wood board, stone slab, or the like. The surface of these media on which pictures are painted is referred to as a "painting surface." The paint medium may be any paint (oil paint, watercolor paint, tempera paint), ink, crayon, pastel, color pencil, or pigment.

Light source 10 is an illumination source used when taking a picture P. To prevent damage to a painting, it is preferable to use cold light as light source 10 so as to suppress heat emission; preferably ultraviolet rays are cut, and more preferably infrared rays are also cut. Camera 20 is an example of an image capture means for capturing picture P.

At step S12, the operator places light source 10 in the reference position relative to picture P. The reference position, the normal line of picture P (specifically, the normal line of the painting surface) and the optical axis of light source 10 are in a predetermined positional relationship, for example, parallel.

At step S13, the operator takes a picture P using camera 20. Initially, image capturing is performed in a state where light source 10 irradiates picture P from the reference position. The image obtained in a state where light is irradiated from light source 10 in the reference position is referred to as image I[0, 0].

Figure 6A:
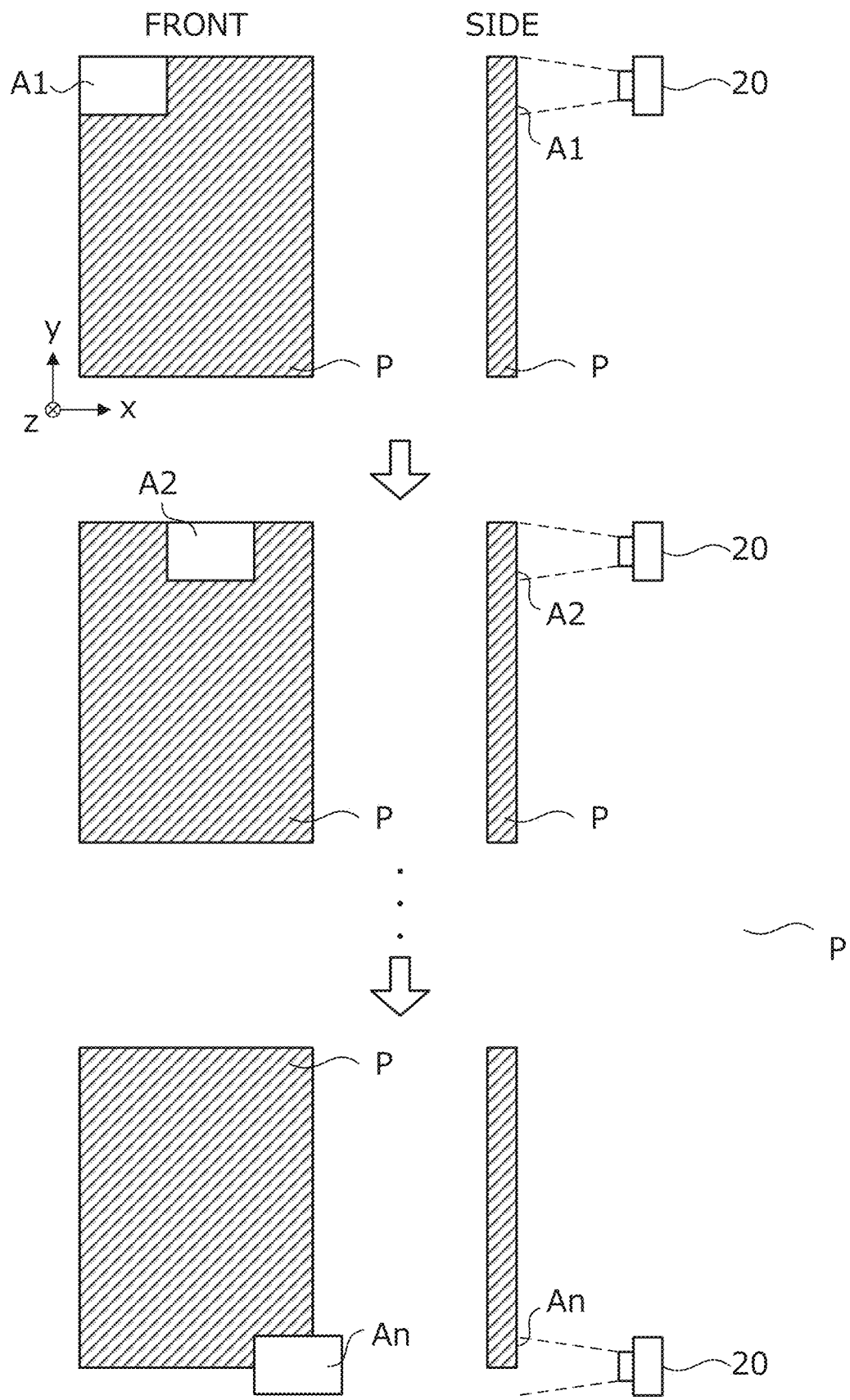
FIG. 6A shows an example of a method of capturing a picture P by a camera 20.
Figure 6B:
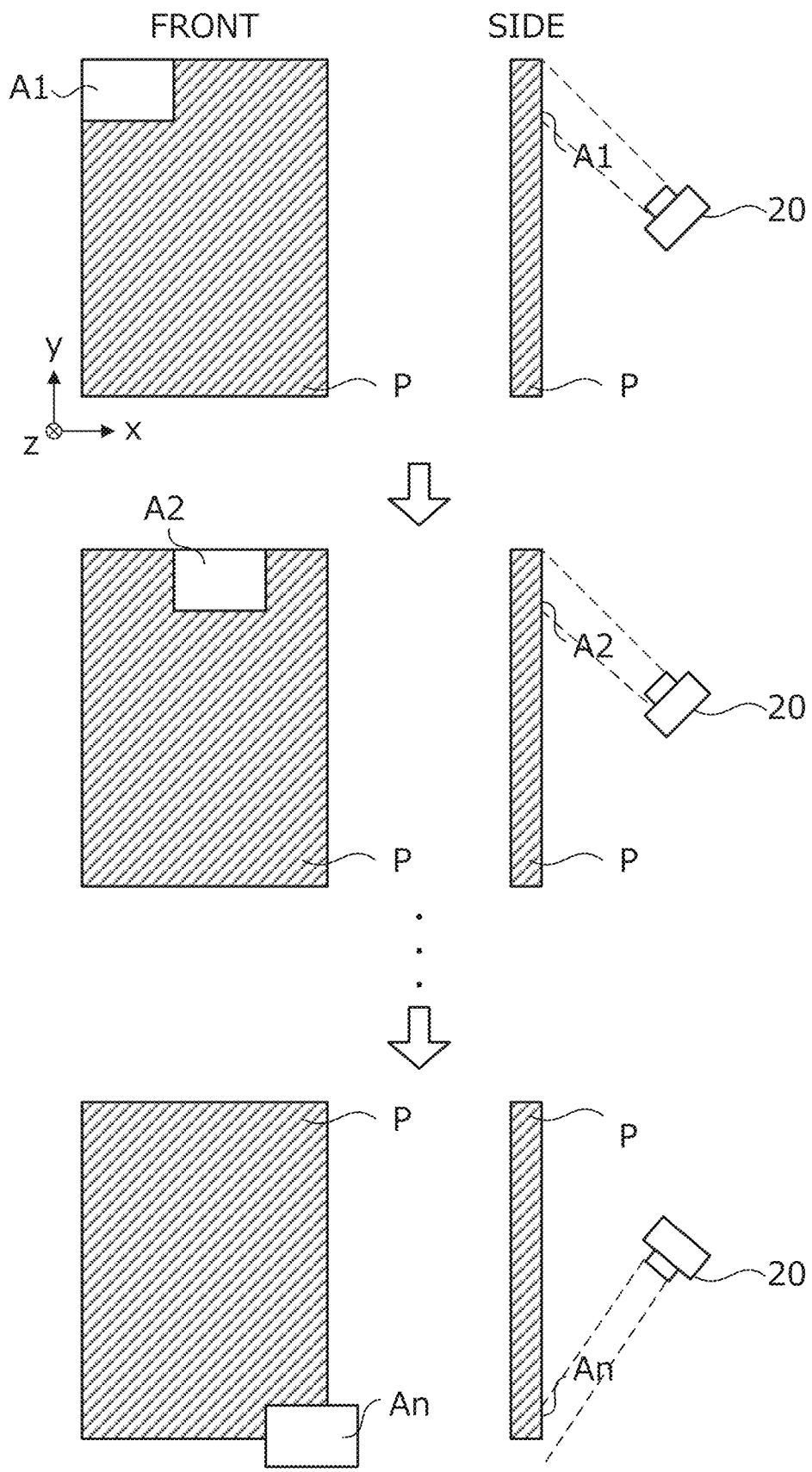
FIG. 6B shows an example of a method of capturing a picture P by camera 20.

FIG. 6A and FIG. 6B are diagrams illustrating a method of capturing picture P with camera 20. To capture a high-definition image, the operator (i) divides picture P into plural unit regions, (ii) captures images of the plurality of unit regions one by one, (iii) combines the plurality of captured images, and (iv) obtains an image of entire picture P. As an example, when the canvas of F30 (910×727 mm) is divided into unit regions of 100 mm (length)×150 mm (width), the canvas is divided into 10 pieces (length)×5? pieces (width). If the number of pixels of the image pickup device of camera 20 is 19440000 pixels, the resolution is 914 dpi. The resolution can be adjusted by the size of the unit area and the number of pixels of the image sensor device of camera 20.

FIG. 6A shows an example in which plural unit areas are captured while camera 20 moves, and FIG. 6B shows an example in which camera 20 captures images of plural unit areas while changing orientation at a predetermined position. The unit area to be captured moves to the right from the upper left unit area as a starting point, for example. When reaching the right end, the unit area to be captured moves to the unit area at the left end of the next lower row. This operation is repeatedly performed until the entire surface of picture P is covered. As shown in FIG. 6A, first, the upper left unit area A1 is captured. After the unit area A1 is captured, camera 20 is moved to capture the next unit area A2. Before and after the movement, the relationship between the direction of the optical axis of camera 20 and the direction of the normal line of picture P is kept constant, (specifically, is kept parallel). Camera 20 sequentially shoots the unit areas A1 to An one by one. A guide rail (not shown in the figures) for moving the camera platform may be used to keep camera 20 and picture P in an appropriate positional relationship during the image capture.

As shown in FIG. 6B, camera 20 is not moved but the orientation of the optical axis is changed. That is, after one unit area is captured, and the orientation but not the position of camera 20 is changed to capture a next unit area. Since the position of camera 20 is fixed, unlike in FIG. 6A, there is no need for a guide rail to move the camera platform. On the other hand, since a relationship between the direction of the optical axis of camera 20 and the direction of the normal line of picture P for each area changes, a problem arises in that an image of an end region, for example, is distorted. Therefore, in the example shown in FIG. 6B distortion compensation is required. In contrast, using the technique shown in FIG. 6A, a relationship between the orientation of the optical axis of camera 20 and an orientation of the normal line of picture P remains constant. Thus, while an advantage exists in that a need for distortion correction is low, a disadvantage exists in that a mechanism for moving camera 20 is required.

Figure 6C:
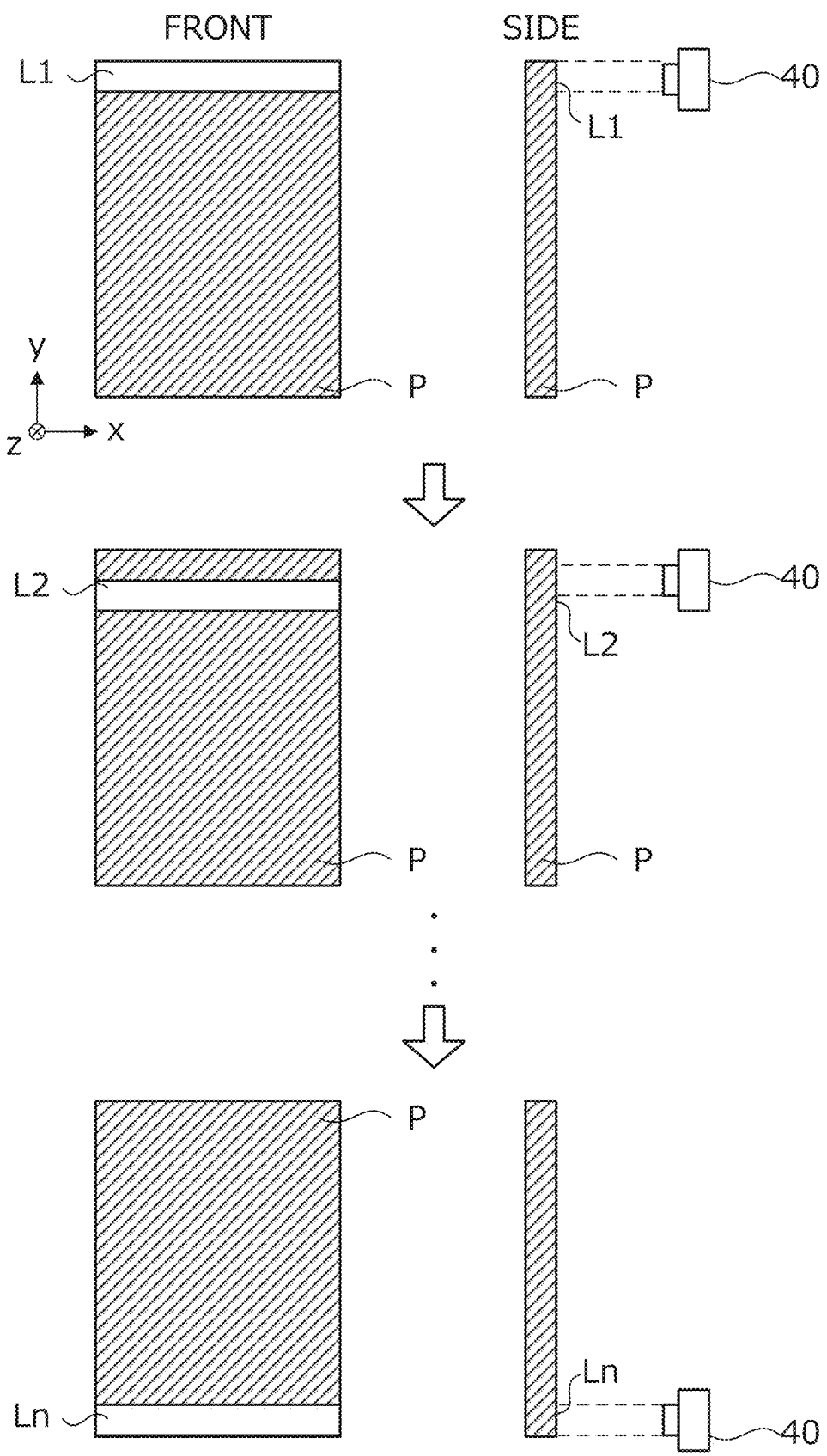
FIG. 6C shows an example of a method of capturing a picture P by camera 20.

FIG. 6C illustrates an example of a method of capturing (scanning) a picture P by an image scanner 40 instead of camera 20. Image scanner 40 reads the image while moving the sensor element in the reading unit (not shown) from the area L1 at one end of the image to the area Ln at the other end of the image. During reading, a light incident angle from the light source (not shown) remains constant in the reading unit of image scanner 40. When entire picture P has been scanned at a certain light incident angle, the light incident angle is changed, and picture P is scanned again.

Regardless of which approach is employed, when camera 20 captures an image of each of unit area it also captures an image of parts of other unit areas around each unit area. Image processing device 30 obtains the plurality of images. Image processing device 30 combines the plurality of captured images by keying overlapping parts to obtain an image.

Referring again to FIG. 5, at step S14, the operator moves the position of light source 10. The sequence for moving the position of the light source is predefined. Light source 10 moves, for example, in the order of (1) a position inclined at an angle $\alpha 1$ in a first direction from a reference position, (2) a position inclined at an angle $\alpha 2$ in a first direction from a reference position, (3) a position inclined at an angle $\beta 1$ in a second direction from the reference position, and (4) a position inclined at an angle $\beta 2$ in a second direction from the reference position. It is of note that a direction set as the first direction and the second direction with respect to picture P can be freely determined. The first direction and the second direction can be determined depending on picture P. In one example, the vertical upward direction is determined as the first direction in a state where picture P is viewed, that is, in a state where picture P is placed in an orientation assumed by the painter. This is because, in general, it is not assumed that a light source will be directed from below when a painting is produced, but rather it is assumed that a light source will be directed from above. When picture P is produced by a right-handed painter and there are many brush touches from left to right, there is a high possibility that irregularities will be apparent when light source 10 is applied from the left. In this case, therefore, the left direction, i.e., the direction from left to right, is determined as the second direction. Alternatively, when picture P is produced by a painter who frequently deploys brush strokes from the lower left to the upper right, the direction from the upper right to the lower left is determined as the second direction.

When image scanner 40 is used, movement of light source 10 described below (step S14) is not performed. However, depending on a structure of the light incident angle varying mechanism in the reading section of image scanner 40, the direction of scanning may be changed, and picture P may be read again. For example, in image scanner 40, when the direction in which the entrance angle can be changed is limited to one direction, specifically, when the light incident angle can be changed only in the x direction while the reading unit is moved along the y axis as shown in FIG. 6C, after scanning picture P in the y direction, picture P is rotated by 90° (i.e., in the x direction) and scanning is performed.

The angle $\alpha 1$ is not particularly limited. If angle $\alpha 2$ belongs to the same quadrant as that of angle $\alpha 1$ in the coordinate axis defined by the surface and normal line of picture P, and angle $\alpha 1$ and the value are different, the angle may be of any value. The angle $\beta 1$ is not particularly limited. The value of the angle $\beta 1$ may be the same as the value of the angle $\alpha 1$ or $\alpha 2$. For angle $\beta 2$, which belongs to the same quadrant as the angle $\beta 1$ in the above coordinate axis, and as long as the angle $\beta 1$ and the value are different, the angle may be of any value. Generally, when camera 20 is used, angles $\alpha 1$, $\alpha 2$, $\beta 1$, and $\beta 2$ are relatively large because the distance between picture P and camera 20 is relatively large. On the other hand, when image scanner 40 is used, angles $\alpha 1$, $\alpha 2$, $\beta 1$, and $\beta 2$ are relatively small because the distance between picture P and camera 20 is relatively small. In one example, angles $\alpha 1$, $\alpha 2$, $\beta 1$, and $\beta 2$ are in the range of 20 to 40 degrees when camera 20 is used or the distance between picture P and the image capture means is more than a few tens of centimeters, and angles $\alpha 1$, $\alpha 2$, $\beta 1$, and $\beta 2$ are in the range of 10 to 20 degrees when image scanner 40 is used or the distance between picture P and the image capture means is on the order of several centimeters.

Figure 7:
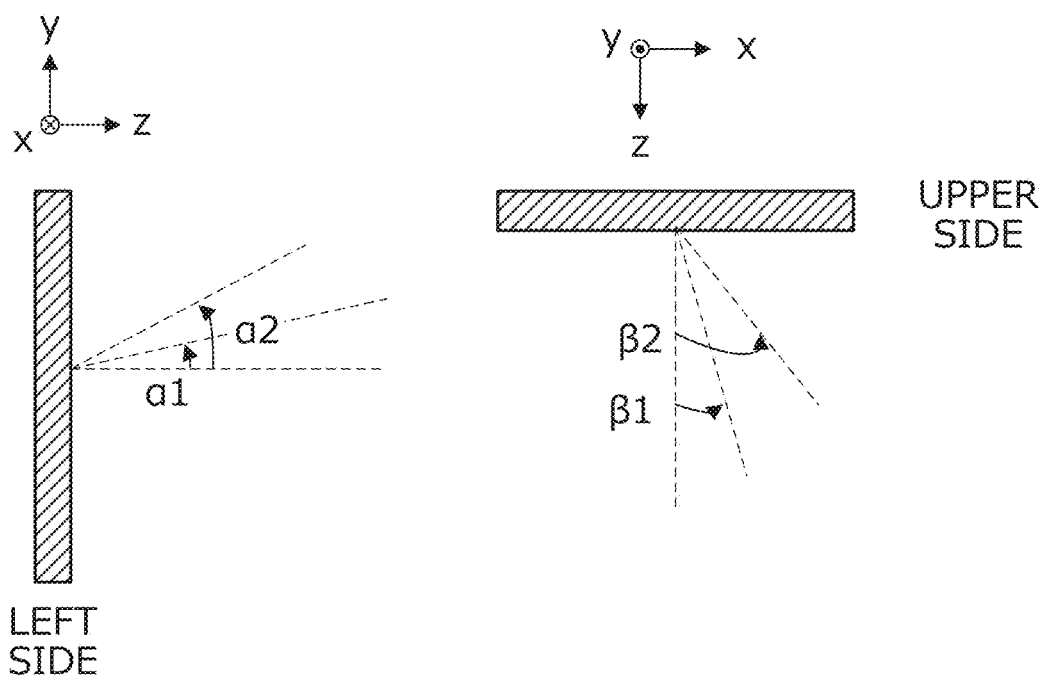
FIG. 7 illustrates angles α1, α2, β1, and β2.

FIG. 7 is a diagram illustrating angles $\alpha 1$, $\alpha 2$, $\beta 1$, and $\beta 2$. For reference, the x-axis is defined rightward, and the y-axis is defined upward relative to picture P, and the z-axis is defined so as to form a right-handed system with respect to this xy-plane. A vector giving an angle $\alpha 1$ with respect to the reference position is represented as a vector $\alpha 1$. The vector α1 and the vector α2 are vectors parallel to the yz plane. The vector β1 and the vector β2 are vectors parallel to the xz plane.

Returning to FIG. 5. At step S15, the operator determines whether the termination condition is satisfied. The end condition is, for example, a condition that shooting of the entire surface of picture P has been completed. When shooting of the entire surface of picture P has been completed, the process proceeds to step S16. If shooting of the entire surface of picture P has not been completed, the process returns to step S13 again.

At step S16, the image processing program creates a three-dimensional map of picture P. The three-dimensional distribution map consists of a diagram showing a distribution of a height of the paint material relative to the painting surface. At this stage, plural images have been obtained where light source 10 is at a different angle. Specifically, as viewed from the reference position, an image obtained in a state of being irradiated with light from light source 10 at a position θ1 in the first direction and θ2 inclined in the second direction is referred to as image I[θ1, θ2]. By repeatedly executing the process of steps S13 to S15, five images are obtained: image I[0, 0], image I[α1, 0], image I[α2, 0], image I[0, β1], and image I[0, β2] in accordance with a sequence of moving the position of light source 10.

Figure 8:
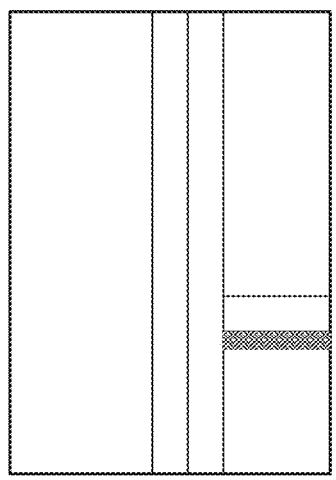
FIG. 8 is a diagram illustrating image I.
Figure 8:
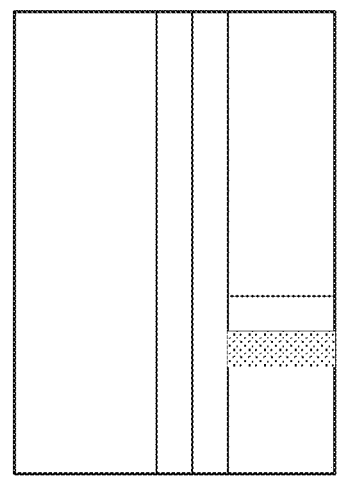
Figure 8:
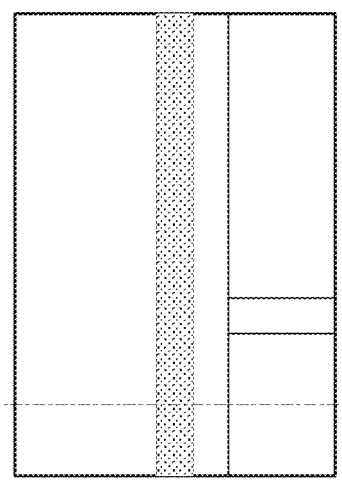
Figure 8:
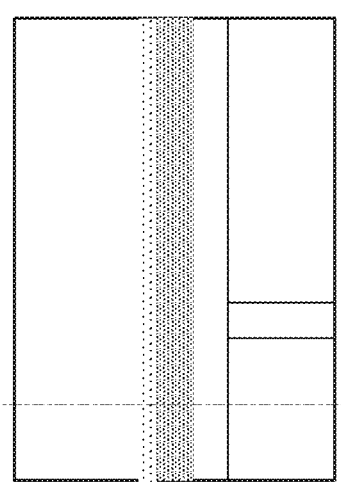
Figure 8:
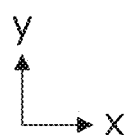

FIG. 8 is a diagram illustrating images I[α1, 0], I[α2, 0], I[0, β1], and I[0, β2]. In each image, shadows corresponding to convex portion 91 and convex portion 92 are formed. The shadow is smaller when the light is irradiated from a small angle relative to the reference position (front surface of picture P), and the shadow is larger when the light is irradiated from a large angle.

Figure 9:
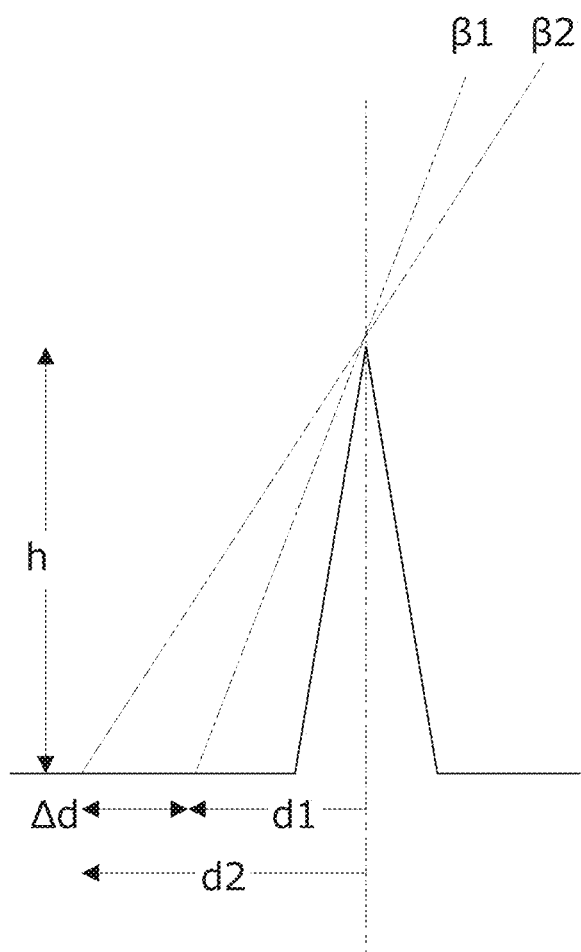
FIG. 9 is a diagram comparing the image I in a cross section parallel to the xz plane.

FIG. 9 is a diagram comparing images I[0, β1] and [0, β2] in a cross section parallel to the xz plane. The difference Δd between the distance d1 from the position (broken line in the figure) corresponding to the vertex 911 of convex portion 91 to the end of the shadow in image I[0, β1] and the distance d2 to the end of the shadow in image I[0, β2] is expressed by the following equation (1).

$$\Delta d = h(\tan \beta_2 - \tan \beta_1) \quad (1)$$

The angles β1 and β2 are known, and the difference Δd is actually measured from the images I[0, β1] and I[0, β2]. Therefore, the height h of convex portion 91 can be calculated by image processing program from Equation (1). As will be apparent from FIG. 9, the image processing program can calculate a height of the vertex of the convex portion in any cross section. In this way, the image processing program creates a three-dimensional map of the entire painting surface of picture P.

Returning to FIG. 5. At step S17, the image processing program specifies a processing target region in the images I[α1, 0], I[α2, 0], I[0, β1], and I[0, β2]. In one example, the processing target area is a region corresponding to a shadow. Alternatively, the processing target region may consist of the entirety of the images I[α1, 0], I[α2, 0], I[0, β1], and I[0, β2]. The image processing program can specify a region corresponding to the shadow by comparing each of the images I[α1, 0], I[α2, 0], I[0, β1], and I[0, β2] with image I[0, 0]. Image I[0, 0] is an image captured while irradiating light from the front of picture P, and is a reference image in which the shadow is as close to zero as possible.

At step S18, the image processing program maps (or aligns) the processing target areas of the images I[α1, 0], I[α2, 0], I[0, β1], and I[0, β2] to the images I[0, 0], respectively. Since images I[0,0], images I[α1,0], images I[α2,0], images I[0,β1], and images I[0,β2] are all taken of the same subject (i.e., picture P), they contain common parts. The image processing program maps the processing target area of each image to image I[0, 0] by keying these common parts.

At step S19, the image processing program combines the images I[α1, 0], I[α2, 0], I[0, β1], and I[0, β2] with image I[0, 0]. Specifically, the image processing program calculates the gradation value Pm (x, y) of each pixel in the image Im after merging, in accordance with the following equation (2).

$$P_m(x, y) = sP[0,0](x, y) + t_1 P[\alpha_1, 0](x, y) + \\ t_2 P[\alpha_2, 0](x, y) + t_3 P[0, \beta_1](x, y) + t_4 P[0, \beta_2](x, y) \quad (2)$$

where s, t1, t2, t3, and t4 are weighting factors. In one example, s>t1=t2=t3=t4.

It is of note that the gradations of the images I[0, 0], I[α1, 0], I[α2, 0], I[0, β1], and I[0, β2] may be normalized prior to the merging. Normalization is, for example, a process of matching a gradation of a reference area (hereinafter referred to as the "reference region") in each image with a gradation of a reference (hereinafter referred to as the "reference gradation"). The reference area is, for example, a flat area of the painting where exposure to light is assumed to be uniform. The reference gradation is, for example, the gradation of the reference region in image I[0, 0]. When the reference region includes plural pixels, the reference gradation is a representative value of the gradation in these plurality of pixels (e.g., an average value).

Further, in picture P, the medium itself may be deformed as a result of storage conditions. For example, picture P stored in the rolled state for a long period of time may have periodic irregularities, undulations, wrinkles, or folds (hereinafter, simply referred to as "deformations") in the medium itself. When such a picture P is captured, a problem arises in that shadows occur in the image due to the changes in the medium. Such shadows are not originally intended by the painter, and if recorded, an image different from that originally painted by the painter will be recorded. In such a case, the image processing program may remove from image I[0, 0] an influence of deformation of the medium. Specifically, the image processing program removes from image I[0, 0] shadows caused by deformation of the medium. Ranges for such shading are designated by the operator, for example. Alternatively, the image-processing program may automatically determine such shadow changes. The image processing program uses information to remove from the obtained image shadows caused by changes to the medium. Thus, in determining whether to remove shadows reference is made to an opinion of, for example, an owner of the painting, a museum curator, or a researcher. The shading may be removed after step S17 and before step S18.

At step S20, the image processing program performs processing (or correction) to emphasize shadows in the merged image. In one example, the process of emphasizing shadows is a process of emphasizing (or enlarging) contrast.

Figure 10A:
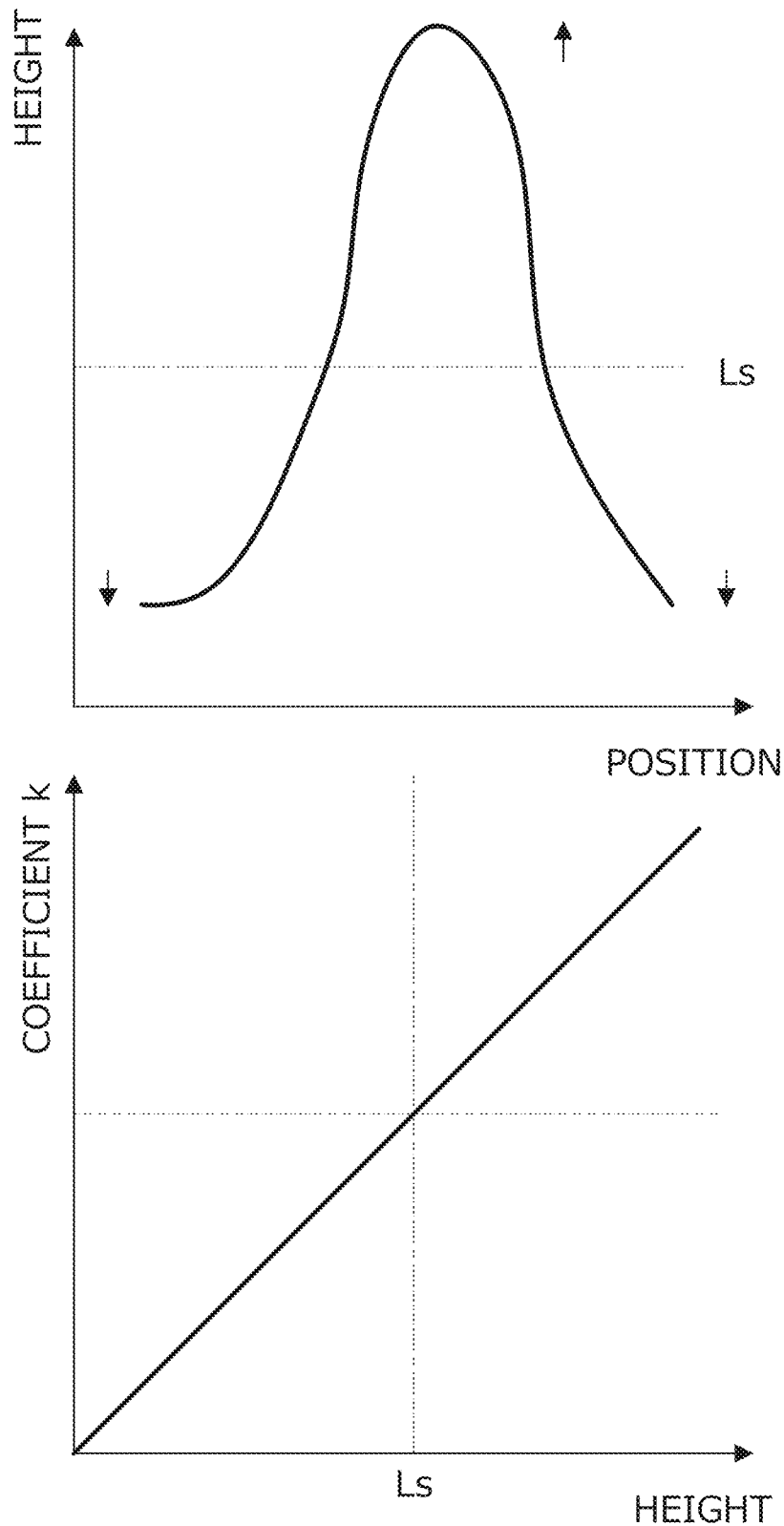
FIG. 10A is a diagram illustrating a shading enhancement process.
Figure 10B:
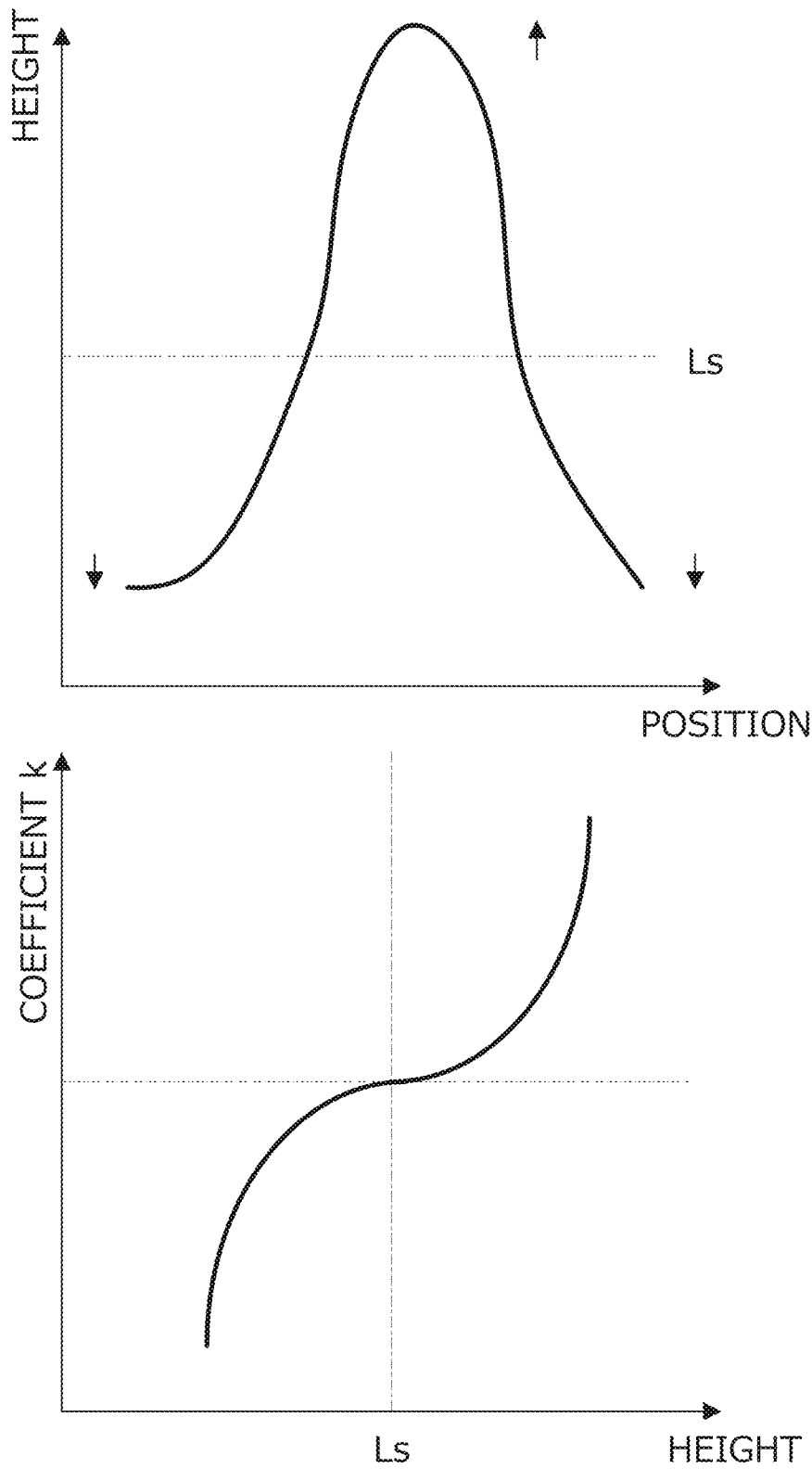
FIG. 10B is a diagram illustrating a shading enhancement process.
Figure 10C:
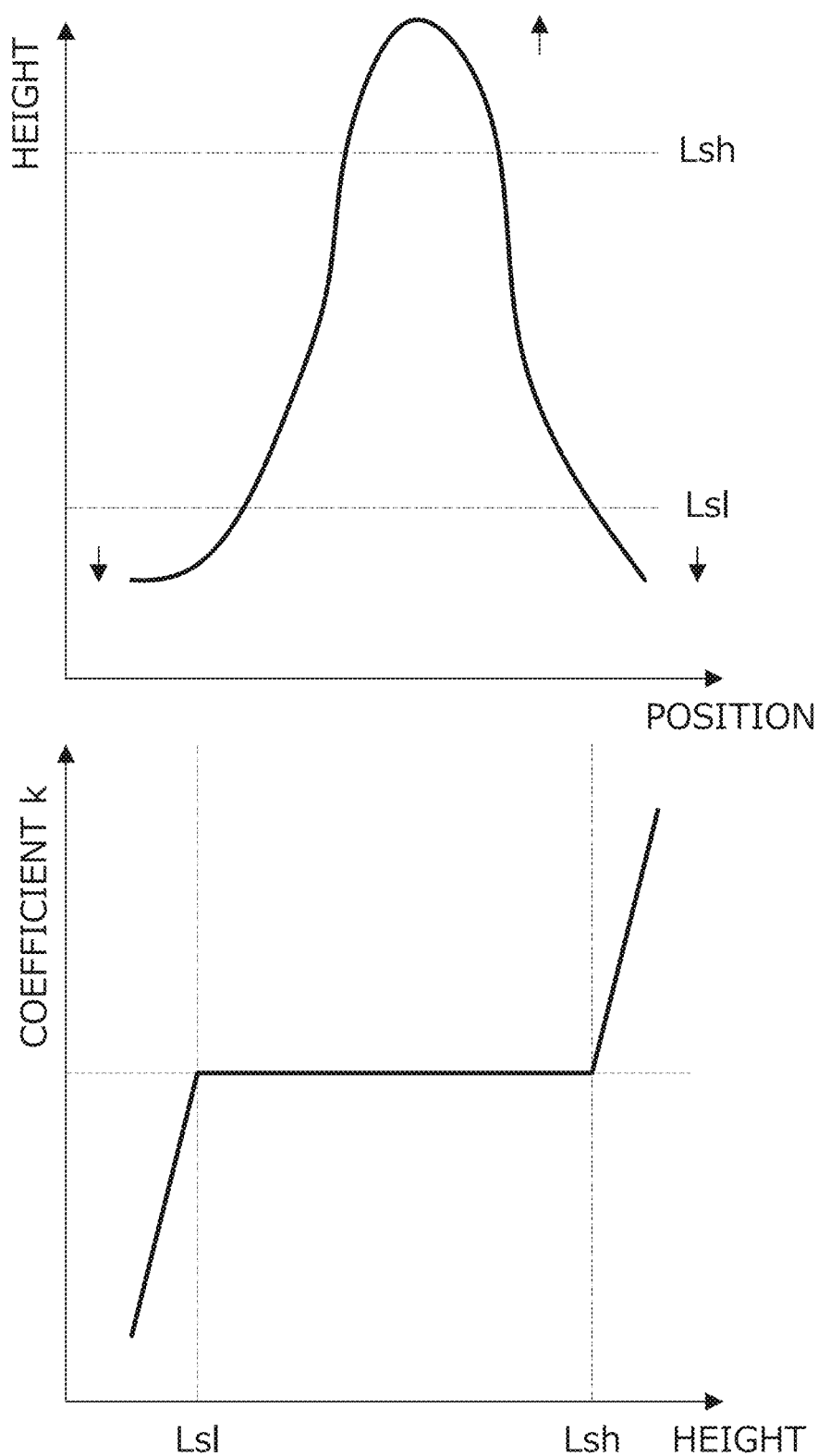
FIG. 10C is a diagram illustrating a shading enhancement process.

FIGS. 10A to 10C show examples of a process for emphasizing shadows. In these figures, the upper part shows the height distribution, i.e. the positional dependence of the height, and the lower part shows the height dependence of the coefficient, respectively. In the diagram showing the height distribution, the horizontal axis represents the physical position of the pixel, while the vertical axis represents the luminance of the pixel. In this example, the brightness is high in the vicinity of the center while the brightness is low at the end. The image processing program corrects the brightness of each pixel so that darker pixels are made darker and lighter pixels are made lighter. In one example, this correction is performed in accordance with the following equation (3).

$$L_a = L_o + k(L_o - L_s) \quad (3)$$

In Equation (3), La and Lo respectively represent luminance after correction and before correction. Ls represents a reference luminance k is a correction factor indicating a degree of contrast enhancement. In FIGS. 10A to C, the lower part shows the correction factor k. In the example shown in FIG. 10A, coefficient k increases linearly with height. In the example shown in FIG. 10B, coefficient k increases or decreases quadratically with height. In the example shown in FIG. 10C, coefficient k is constant when the height L ranges from Lsl<L<Lsh. In a region where L is higher than this range, coefficient k increases as the height increases, and in a region where the height L is lower, coefficient k decreases as the height decreases. In the examples shown in each of FIGS. 10A to C, the change in coefficient k is point-symmetrical relative to the height L as a reference. However, the change in coefficient k may not be symmetrical relative to the higher end and the lower end heights. Coefficient k is in the order of 1 to 5% at a maximum, and more preferably 2 to 4%, and in the order of −1 to −5% at a minimum, and more preferably −2 to −4%.

The reference brightness is, for example, an average brightness in image I[0,0]. Alternatively, the reference brightness may be an average brightness in the image to be corrected. Furthermore, the reference luminance may be a value determined regardless of image I[x] (e.g., an intermediate value between the maximum luminance and minimum luminance that can be represented in the system). The image processing program performs the emphasizing processing (or correction) of Equation (2) on each of the images I[α1, 0], I[α2, 0], I[0, β1], and I[0, β2].

Returning again to FIG. 5. At step S21, the image processing program records the image data obtained by merging in recording means 35. According to studies carried out by the present inventors, when an image is formed (e.g., printed) on a medium such as paper in accordance with image data processed in this manner, convexities are visible to the human eye even though physically the image is a two-dimensional image. That is, if this data is used, a two-dimensional image having a texture and three-dimensional effect of the original picture can be obtained by printing with a general-purpose printer. As described above, according to the present embodiment, it is possible to obtain two-dimensional image data in which the texture and three-dimensional effect of the original picture are recorded with high reproducibility.

It is of note that the image processing program may perform processing to widen a dynamic range of a color gamut, i.e., so-called grading processing, on the recorded image data, i.e., the entire image. According to research carried out by the inventors of the present application, it has been confirmed that a quality of the output image is improved by performing grading processing prior to outputting the output image. The output may be of any type, such as an image formed on a paper medium and printed by a printer, an image formed by offset printing, a display on a display device such as an LCD (Liquid Crystal Display), an LED (Light Emitting Diode) display, or a OLED (Organic Light Emitting Diode display.

4. Modification

The present invention is not limited to the embodiments described above, and various modifications are available. Examples of such modifications are described below. Two or more of the following modifications may be combined.

The sequence of moving light source 10 is not limited to that illustrated in the embodiment. For example, in the second direction, in addition to the angles β1 and β2, light source 10 may be moved to a position inclined by the angles β3 and ⊖4, and picture P may be captured while being irradiated with light. In this case, the angles β3 and β4 may reside in quadrants that are symmetrical relative to the normal line of picture P with respect to the angles β1 and β2. That is, if the angles β1 and β2 are directions corresponding to the right side of picture P, the angles β3 and β4 are directions corresponding to the left side of picture P. By performing light irradiation from the opposite sides in this manner, for example, information (for example, color or a change thereof) of a region with a strong shadow (i.e., a dark region) can be obtained.

Light irradiation from the angle α3 and the angle α4 (lower side) is not performed in the first direction because it is assumed that such light irradiation does not exist for the original painting. It can be confirmed or estimated that the painter irradiates light from the lower side, or when a particular circumstance exists, such as that for a ceiling painting, picture P may be captured while irradiating light from the angle α3 and the angle α4 (lower side) in the first direction.

Alternatively, in addition to the first direction and the second direction, picture P may be captured while being irradiated with light from the third direction, and this image may be used for merging. When information is missing only with respect to light irradiation from the first direction and the second direction, for example, and there is a region in which light irradiation from the upper direction and the light irradiation from the left direction are shadowed, an image obtained with light irradiated from the third direction is useful in compensating for the missing information.

Alternatively, image capture may be performed from only a single angle in at least one of the first direction and the second direction. For example, in the second direction, image capture from the angle β2 may not be performed, and only the image capture from the angle β1 may be performed.

The entity which executes the process of the image processing method is not limited to that illustrated in the embodiment. A part or all of the processing described as being performed by the operator in the embodiment may be performed by software such as an image processing program or hardware such as a device (not shown) for moving light source 10 and camera 20. On the contrary, a part or all of the processing described as being performed by the image processing program in the embodiment may be performed by the operator. Alternatively, plural programs may cooperate to execute the processing described in the embodiment instead of a single program.

The hardware configuration of information processing system 1 is not limited to the examples described in the embodiments. Image processing system 1 may have any hardware configuration as long as a required function can be implemented. For example, image processing device 30 may assign some of its functions to a server (a so-called cloud) in a network.

The program executed by CPU 301 or the like may be provided in a state recorded on a non-temporary recording medium such as a CD-ROM, or may be provided in a state downloadable from a network server.

The invention claimed is:

1. An image processing method comprising:
    preparing a picture to be converted into data, a light source for irradiating the picture with light, and an image capture device for capturing an image of the picture;
    installing the image capture device at a position where an optical axis of the image capture device and a normal line of the picture have a predetermined relationship;
    obtaining an image $I[0,0]$ of the picture captured by the image capture device, in a state where the light is irradiated to the picture from the light source at a reference position relative to the normal line of the picture;
    obtaining an image $I[\alpha 1,0]$ of the picture captured by the image capture device, in a state where the light is irradiated to the picture from the light source at a position inclined from the reference position at an angle $\alpha 1$ in a first direction;
    obtaining an image $I[0, \beta 1]$ of the picture captured by the image capture device, in a state where the light is irradiated to the picture from the light source at a position inclined from the reference position at an angle $\beta 1$ in a second direction different from the first direction;
    obtaining an image $I[0, \beta 2]$ of the picture captured by the image capture device, in a state where the light is irradiated to the picture from the light source at a position inclined from the reference position at an angle $\beta 2$ in the second direction;
    creating a three-dimensional map of the picture, using a set of the images $I[0, \beta 1]$ and $I[0, \beta 2]$;
    merging at least a part of each of the image $I[\alpha 1,0]$, the image $I[0,\beta 1]$, and the image $I[0,\beta 2]$ with respect to the image $I[0,0]$, to generate a merged image;
    performing an emphasizing process to emphasize a shadow of the merged image in accordance with a height indicated by the three-dimensional map to generate an emphasized image; and
    recording, as two-dimensional image data, the emphasized image.

2. The image processing method according to claim 1, further comprising:
    obtaining an image $I[\alpha 2,0]$ of the picture captured by the image capture device, in a state where the light is irradiated to the picture from the light source at a position inclined from the reference position by an angle $\alpha 2$ different from the angle $\alpha 1$ in the first direction, wherein
    in the creating of the three-dimensional map, the image $I[\alpha 1, 0]$, the image $I[\alpha 2, 0]$, the image $I[0, \beta 1]$, and the image $I[0, \beta 2]$ are used, and
    in the merging, at least a part of each of the image $I[\alpha 1, 0]$, the image $I[\alpha 2, 0]$, the image $I[0, \beta 1]$, and the image $I[0, \beta 2]$ is merged with the image $I[0, 0]$.

3. The image processing method according to claim 2, wherein
    the emphasizing process is a process for emphasizing a contrast of the shadow.

4. The image processing method according to claim 1, wherein
    the emphasizing process is a process for emphasizing a contrast of the shadow.

5. The image processing method according to claim 4, wherein
    in the emphasizing process, processing is performed in which the contrast of the shadow increases as the height increases.

6. A non-transitory computer-readable medium for causing a computer to execute a process by a processor so as to perform the steps of:
    preparing a picture to be converted into data, a light source for irradiating the picture with light, and an image capture device for capturing an image of the picture;
    installing the image capture device at a position where an optical axis of the image capture device and a normal line of the picture have a predetermined relationship;
    obtaining an image $I[0,0]$ of the picture captured by the image capture device, in a state where the light is irradiated to the picture from the light source at a reference position relative to the normal line of the picture;
    obtaining an image $I[\alpha 1,0]$ of the picture captured by the image capture device, in a state where the light is irradiated to the picture from the light source at a position inclined from the reference position at an angle $\alpha 1$ in a first direction;
    obtaining an image $I[0, \beta 1]$ of the picture captured by the image capture device, in a state where the light is irradiated to the picture from the light source at a position inclined from the reference position at an angle $\beta 1$ in a second direction different from the first direction;
    obtaining an image $I[0, \beta 2]$ of the picture captured by the image capture device, in a state where the light is irradiated to the picture from the light source at a position inclined from the reference position at an angle $\beta 2$ in the second direction;
    creating a three-dimensional map of the picture, using a set of the images $I[0, \beta 1]$ and $I[0, \beta 2]$;
    merging at least a part of each of the image $I[\alpha 1,0]$, the image $I[0,\beta 1]$, and the image $I[0,\beta 2]$ with respect to the image $I[0,0]$, to generate a merged image;
    performing an emphasizing process to emphasize a shadow of the merged image in accordance with a height indicated by the three-dimensional map to generate an emphasized image; and
    recording, as two-dimensional image data, the emphasized image.

7. The non-transitory computer-readable medium according to claim 6, further comprising:
    obtaining an image $I[\alpha 2,0]$ of the picture captured by the image capture device, in a state where the light is irradiated to the picture from the light source at a position inclined from the reference position by an angle $\alpha 2$ different from the angle $\alpha 1$ in the first direction, wherein
    in the creating of the three-dimensional map, the image $I[\alpha 1, 0]$, the image $I[\alpha 2, 0]$, the image $I[0, \beta 1]$, and the image $I[0, \beta 2]$ are used, and
    in the merging, at least a part of each of the image $I[\alpha 1, 0]$, the image $I[\alpha 2, 0]$, the image $I[0, \beta 1]$, and the image $I[0, \beta 2]$ is merged with the image $I[0, 0]$.

8. The non-transitory computer-readable medium according to claim 7, wherein
    the emphasizing process is a process for emphasizing a contrast of the shadow.

9. The non-transitory computer-readable medium according to claim 8, wherein
the contrast of the shadow increases as the height increases.

10. The non-transitory computer-readable medium according to claim 6, wherein
the emphasizing process is a process for emphasizing a contrast of the shadow.

11. The non-transitory computer-readable medium according to claim 10, wherein
the contrast of the shadow increases as the height increases.

12. An image processing device, comprising:
a memory configured to store a program; and
a processor configured to execute the program so as to:
obtain an image I[0,0] of a picture captured by an image capture device, in a state where light is irradiated to the picture from a light source at a reference position relative to a normal line of the picture, the picture being converted into data, the image capture device being installed at a position where an optical axis of the image capture device and the normal line of the picture have a predetermined relationship;
obtain an image I[$\alpha$1,0] of the picture captured by the image capture device, in a state where the light is irradiated to the picture from the light source in a position inclined from the reference position at an angle $\alpha$1 in a first direction;
obtain an image I[0, $\beta$1] of the picture captured by the image capture device, in a state where the light is irradiated to the picture from the light source at a position inclined from the reference position at an angle $\beta$1 in a second direction different from the first direction;
obtain an image I[0, $\beta$2] of the picture captured by the image capture device, in a state where the light is irradiated to the picture from the light source at a position inclined from the reference position at an angle $\beta$2 in the second direction;
create a three-dimensional map of the picture, using a set of the images I[0, $\beta$1] and I[0, $\beta$2];
merge at least a part of each of the image I[$\alpha$1,0], the image I[0,$\beta$1], and the image I[0,$\beta$2] with respect to the image I[0,0] to generate a merged image;
perform an emphasizing process to emphasize a shadow of the merged image in accordance with a height indicated by the three-dimensional map to generate an emphasized image; and
record, as two-dimensional image data, the emphasized image.

13. The image processing device according to claim 12, wherein the processor is further configured to obtain an image I[$\alpha$2,0] of the picture captured by the image capture device, in a state where the light is irradiated to the picture from the light source at a position inclined from the reference position by an angle $\alpha$2 different from the angle $\alpha$1 in the first direction,
when the three-dimensional map is created, the image I[$\alpha$1, 0], the image I[$\alpha$2, 0], the image I[0, $\beta$1], and the image I[0, $\beta$2] are used, and
at least a part of each of the image I[$\alpha$1, 0], the image I[$\alpha$2, 0], the image I[0, $\beta$1], and the image I[0, $\beta$2] is merged with the image I[0, 0].

14. The image processing device according to claim 13, wherein
the emphasizing process is a process for emphasizing a contrast of the shadow.

15. The image processing device according to claim 14, wherein
the contrast of the shadow increases as the height increases.

16. The image processing device according to claim 12, wherein
the emphasizing process is a process for emphasizing a contrast of the shadow.

17. The image processing device according to claim 16, wherein
the contrast of the shadow increases as the height increases.

* * * * *